May 31, 1960

M. C. VOSBURGH ET AL 2,938,949

ELECTRONIC MARKER GENERATOR

Filed May 9, 1957

Inventors
MALCOLM C. VOSBURGH
ELMER BAUM
SYLVESTER A. DE MARS
By *Percy P. Lantzy*
Attorney May 31, 1960 M. C. VOSBURGH ET AL 2,938,949
ELECTRONIC MARKER GENERATOR
Filed May 9, 1957 2 Sheets-Sheet 2

Inventors
MALCOLM C. VOSBURGH
ELMER BAUM
SYLVESTER A. DE MARS
By Percy P. Landry
Attorney

United States Patent Office 2,938,949
Patented May 31, 1960

2,938,949

ELECTRONIC MARKER GENERATOR

Malcolm C. Vosburgh, Montclair, and Elmer Baum, River Edge, N.J., and Sylvester A. Demars, Eau Gallie, Fla., assignors to International Telephone and Telegraph Corporation, Nutley, N.J., a corporation of Maryland Filed May 9, 1957, Ser. No. 658,918

2 Claims. (Cl. 178—6.8)

This invention refers to marker generators for cathode ray tube displays and more particularly to electronic marker generators.

Cathode ray tube displays are employed for two general types of measurements. First, the measurement of a time interval for the purpose of calibration, for plotting and for navigation. Second, the measurement of a range and rate of change of range of a target for the purpose of precise navigation and fire control. It is often desired to place a visible marker on a spot within a cathode ray tube presentation, such as a set of cross hairs on a radar display to determine the coordinate position of the spot and, at the same time, obtain control signals which are a function of the marker's position.

It is also advantageous in an entirely different field, as television broadcasting, to blank out or to superimpose upon portions of a televised program matter that would appear on the picture tube.

It is therefore an object of this invention to provide a method for generating a marker image on the screen of a cathode ray tube.

A further object is to provide an electronic marker image for super-position upon the signal display of the screen of the cathode ray tube.

Still another object is to provide an electronic marker image upon the screen of a cathode ray tube and, at the same time, project control signals which are a function of the marker position.

A feature of this invention is the provision for a pointer which is adapted to be moved manually across the surface of a cathode ray tube and coupled by a mechanical linkage to a marker pattern which moves in unison with the pointer between the surface of a flying spot cathode ray tube and a photo-sensitive device to generate a signal which is fed to the screen of the cathode ray tube to produce thereon the image of the marker pattern.

Another feature is that the signal developed in the photo-sensitive device by the movement of the marker pattern is amplified and compared with a reference signal to derive a signal which is used to operate the apparatus of a radar and also gun controls.

The above-mentioned and other features and objects of this invention will become more apparent by reference to the following description taken in conjunction with the accompanying drawings, in which.

Figure 1:
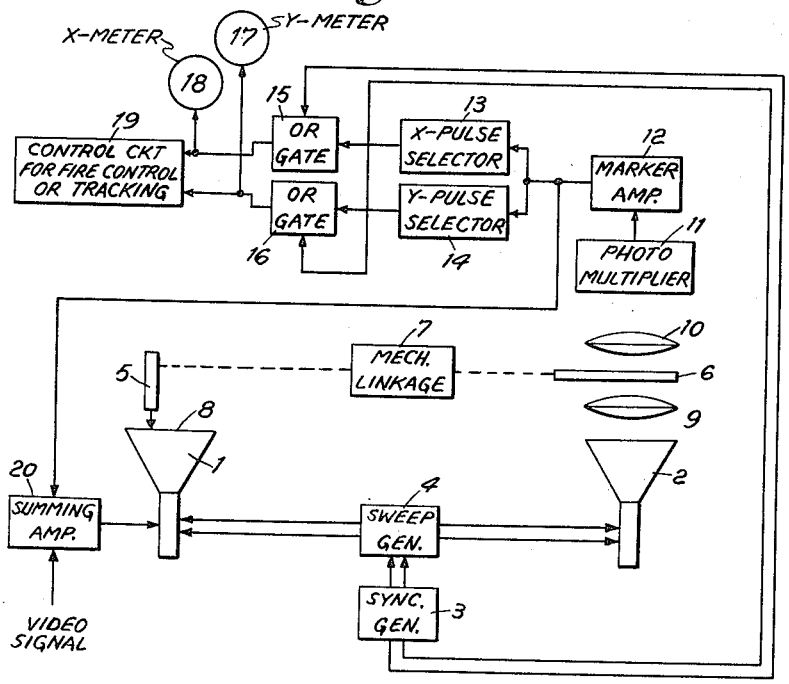
Fig. 1 is a block diagram of one embodiment of this invention.

With reference to Fig. 1, there is shown a cathode ray display tube 1 and a flying spot scanner tube 2. A synchronizing generator 3 is coupled to the sweep generator 4 which is coupled to the cathode ray tube 1 and the flying spot tube 2 so that the horizontal and vertical scanning of both tubes are in synchronism. The horizontal and vertical scanning are similar to standard television display circuits with two separate sawtooths simultaneously applied to the vertical and horizontal plates of the cathode ray tube. The horizontal sawtooth is of short duration while the vertical sawtooth is of much longer duration and the circuitry is, of course, adjustable to any desired time. A pointer 5 is attached to a marker pattern 6 by means of a mechanical linkage 7, which may be a pantograph or any other suitable linkage, to transmit the same relative motion of the pointer 5 across the surface 8 of the tube 1 to the marker pattern 6 as it moves in front of the flying spot scanner 2. On either side of the marker pattern 6 and axially of the flying spot tube 2 are two lenses 9 and 10 which serve to focus the light spot of the flying spot tube 2 on the marker pattern 6 and then project it on the photomultiplier 11. The output of the photomultiplier 11 is then fed to the marker amplifier 12. The output of amplifier 12 is coupled to an x or narrow pulse selector 13 and a y or wide pulse selector 14. These pulse width selectors 13 and 14, also known as pulse discriminators, are well known and an example thereof is described in the publication "Threshold Signals," volume 24 of the M.I.T. Radiation Laboratories Series, edited by Messrs. Chance, Hulsinger, Macnichol and Williams, published by McGraw-Hill Book Company at pp. 363 to 365. The output of the pulse selector 13 and the horizontal synchronizing pulse output of the synchronizing generator 3 are coupled to the OR gate 15, such for example as is described in the publication "Pulse and Digital Circuits" by Jacob Millman and Herbert Taub, published by McGraw-Hill Book Company, 1956, at pp. 394–397. The output of the pulse selector 14 and the vertical synchronizing pulse output of the synchronizing circuit 3 are coupled to the OR gate 16. The pulse output of OR gates 15 and 16 are fed to x meter 17 and y meter 18 such, for example, as provided by the Berkely 7250 time interval Meter, manufactured by the Berkely Division of Beckman Instruments, Inc., Richmond, California, for instantaneous x and y coordinate determination and are also coupled to utilization circuit 19. The video signal and the output of the marker amplifier 12 are coupled to the summing amplifier 20, such, for example, as is described in the publication "Electronic and Radio Engineering," by F. E. Terman published by McGraw-Hill Book Company, Inc., fourth edition at pp. 663 to 664. The output of amplifier 20 is coupled to the cathode ray tube 1 for display on the screen thereof.

Figure 2:
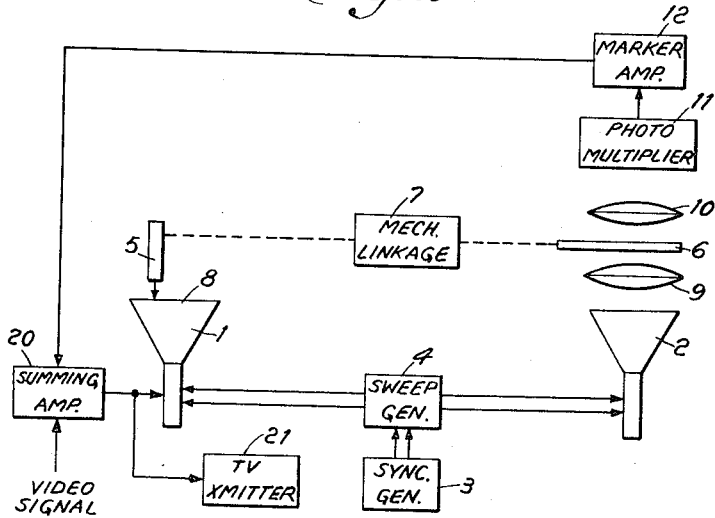
Fig. 2 is a block diagram of another embodiment of this invention.

Figure 2 shows the circuitry of Fig. 1 omitting the pulse selectors 13 and 14, gates 15 and 16, the x meter 18, the y meter 17 and the utilization circuit 19. The output of the summing amplifier 20 is coupled both to the cathode ray tube 1 and a television transmitter 21. This circuit is adapted for those cases where only the marker image for superposition is desired or a portion of the picture is to be blanked out, as television broadcasting, and no control circuitry is required.

Figure 5:
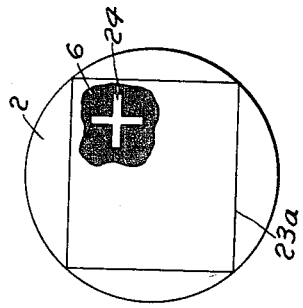
Fig. 5 is a view of the flying spot tube with the marker pattern in the same relative position as the cross-hair marker of Fig. 4.
Figure 4:
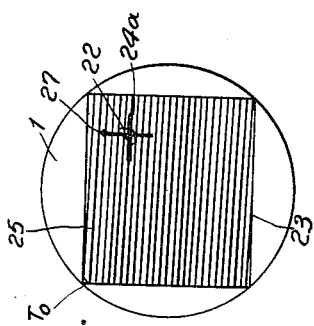
Fig. 4 is a view of the same display with the cross-hair marker.
Figure 3:
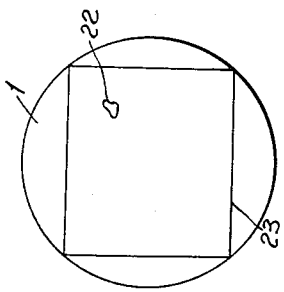
Fig. 3 is a view of a radar display on the screen of the cathode ray tube without the cross-hair marker.

The operation of the invention is as follows. The sweep generator 4 and the synchronizing generator 3 supply two identical sweeps to the deflection circuits of the cathode ray tube 1 and the flying spot scanner tube 2. The raster thus produced is a conventional television type raster without interlace, the horizontal scan rate being some 500 per second and the vertical scan rate 30 per second. This raster is produced by a 500 cycle sawtooth waveform being applied to the x deflection plate and a 30 cycle sawtooth applied to the y deflection plate of the respective tubes. The video signal fed into the display tube 1 from the amplifier 20 will be displayed on the screen of the tube 1 and will be seen as the signal spot 22, for example, in the raster area 23 as shown in Fig. 3. The pointer 5 will be pointed at the spot 22 and will move the marker pattern 6 to the same relative position with respect to the flying spot tube 2. Fig. 5 shows this relationship where the marker pattern 6 contains the cross hairs 24 which are to be transmitted by the flying spot through the photomultiplier 11, the marker amplifier 12 and the amplifier 20 to appear on the screen of the display tube 1 as 24a in Fig. 4. The center of the cross hairs image 24a is at the same point, that is, the center of spot 22, at which the pointer is directed. Also in Fig. 4 are shown the horizontal scanning lines 25. Point 27 is the first portion of the cross hairs image 24a which is illuminated by the scanning beam of the cathode ray tube 1. $T_0$ represents the zero reference point when time equals zero and is the reference for both vertical and horizontal scanning, this reference being supplied by the vertical and horizontal synchronizing pulses. The horizontal scan is made much faster than the vertical scan. Whenever the raster traverses the vertical cut out portion of the marker pattern 6, a short pulse is produced, and whenever the raster traverses the horizontal cut out portion of the pattern 6, a much longer pulse is produced.

Figure 6:
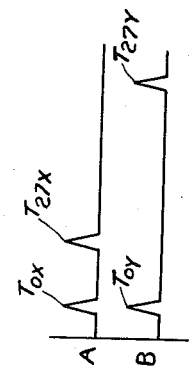
Fig. 6 shows the resulting signal when the marker signal is compared to the reference signal in two coordinate positions.

The output of the amplifier 12 is the amplified marker signal pulses produced by the action of the flying spot tube 12 on the photomultiplier 11. These signal pulses are fed into the amplifier 20 and combined with the video signal to produce the combined video signal and marker image on the screen of the display tube 1. Where that is the only requirement of the system as in television broadcasting, previously mentioned, no other use is made of the output signal of the amplifier 12. However, in radar tracking and associated fire control, there is required indications of the marker position as a function of time. Therefore, in these cases, the output of the amplifier 12 is split up into its component parts, that is, the short pulse or x component and the long pulse or y component. The x component pulse is much shorter than the y component pulse, so that separation of the two pulses can be made in the pulse selectors 13 and 14. After passing through the pulse selectors 13 and 14, the pulses are compared in time relationship with the x and y reference synchronizing pulses, in the OR gates 15 and 16 and the outputs thereof are obtained which are shown in Fig. 6. In other words, the pulses now separated may be used as time markers when referred against the vertical and horizontal scanning signals to indicate the position of the marker pattern with respect to the scanning raster. The horizontal scan duration is approximately 2000 microseconds per sweep. When a gate (which is included in each meter 17 and 18) is opened at the beginning of the sweep and closed at the time of generation of the short pulse at the x pulse selector 13 and the number of clock pulses passed by the gate counted, the count will be proportional to the distance of the vertical bar in the marker pattern 6 from the origin of the horizontal sweep. Similarly, a measurement of displacement of the horizontal portion of the marker pattern 6 from the origin of the vertical sweep may be determined. Fig. 6a shows the combined signal pulse of the horizontal component as a function of time where $T_{0x}$ is the reference point and the time interval between $T_{0x}$ and spot 27 is represented by the displacement of pulse $T_{27x}$. The vertical component of the position of point 27 is represented in Fig. 6b where $T_{0x}$ is the vertical reference pulse, $T_{27}$ is the vertical pulse denoting point 27 and the distance between the two pulses is a measure of the elapsed time therebetween. The pulse outputs of the gates 15 and 16 can be used in the utilization circuit 19 to control the tracking apparatus of the radar system and for fire control and to determine the instantaneous coordinate position of the spot 22 as in the x and y meters, 18 and 19.

While we have described above the principles of our invention in connection with specific apparatus, it is to be clearly understood that this description is made only by way of example and not as a limitation to the scope of our invention as set forth in the objects thereof and in the accompanying claims.

We claim:

1. In combination; a display cathode ray tube, means to apply video signals to said cathode ray tube for display on the screen thereof, a pointer adapted to be moved over the surface of said cathode ray tube with a part thereof pinpointing a selected object in said display, said pointer being movable to follow said object, a marker pattern, means coupling said pointer to said marker pattern to move said marker pattern in unison with said pointer as said pointer follows said object, means associated with said marker pattern to generate marker signals representative of the position of said marker pattern, means coupling said marker signals to said cathode ray tube to display on the screen of said cathode ray tube a marker indication corresponding to the location of said pointer, the means for generating said marker signals comprising photosensitive means including a flying spot cathode ray tube and a photomultiplier disposed on opposite sides of said marker pattern to produce said marker signals, said flying spot cathode ray tube further comprising a synchronizing source and scanning means, said marker signals comprising short pulses indicative of the x coordinate position of said object and long pulses indicative of the y coordinate position of said object and means coupled to said marker signals and said synchronizing source to determine the location of said object.

2. In combination; a display cathode ray tube, means to apply video signals to said cathode ray tube for display on the screen thereof, a pointer adapted to be moved over the surface of said cathode ray tube with a part thereof pinpointing a selected object in said display, said pointer being movable to follow said object, a marker pattern, means coupling said pointer to said marker pattern to move said marker pattern in unison with said pointer as said pointer follows said object, means associated with said marker pattern to generate marker signals representative of the position of said marker pattern, means coupling said marker signals to said cathode ray tube to display on the screen of said cathode ray tube a marker indication corresponding to the location of said pointer, the means for generating said marker signals comprising photosensitive means including a flying spot cathode ray tube and a photomultiplier disposed on opposite sides of said marker pattern to produce said marker signals, said flying spot cathode ray tube further comprising a synchronizing source and scanning means, marker signals comprising short pulses indicative of the x coordinate position of said object and long pulses indicative of the y coordinate position of said object, means coupled to the output of said photomultiplier to separate said marker signals into said short and long pulses, and means coupled to the output of said separating means and to said synchronizing sources to compute the elapsed time of occurrence of said short pulses and said long pulses and thereby determine the location of said object.

References Cited in the file of this patent

UNITED STATES PATENTS

| | | |
|---|---|---|
| 2,513,490 | Jones | July 4, 1950 |
| 2,522,528 | McNally | Sept. 15, 1950 |
| 2,540,943 | Hales | Feb. 6, 1951 |
| 2,622,240 | Fleming-Williams | Dec. 16, 1952 |
| 2,636,166 | Herbst | Apr. 21, 1953 |

FOREIGN PATENTS

| | | |
|---|---|---|
| 750,628 | Great Britain | June 20, 1956 |

OTHER REFERENCES

Radio Engineering, third edition, by F. E. Terman, published by McGraw-Hill Book Co., Inc. 1947, page 834 relied on. (Copy in Scientific Library, U.S.P.O.)